United States Patent
Burgoon et al.

(10) Patent No.: US 9,132,809 B2
(45) Date of Patent: Sep. 15, 2015

(54) INTEGRATED PARKING BRAKE FOR DISC BRAKE

(71) Applicant: Performance Friction Corporation, Clover, SC (US)

(72) Inventors: Donald L. Burgoon, Gastonia, NC (US); Mark Wagner, Weddington, NC (US); Darin Cate, York, SC (US)

(73) Assignee: Performance Friction, Clover, SC (US)

( * ) Notice: Subject to any disclaimer, the term of this patent is extended or adjusted under 35 U.S.C. 154(b) by 57 days.

(21) Appl. No.: 14/058,047

(22) Filed: Oct. 18, 2013

(65) Prior Publication Data

US 2014/0110197 A1   Apr. 24, 2014

Related U.S. Application Data

(60) Provisional application No. 61/715,578, filed on Oct. 18, 2012.

(51) Int. Cl.
| | | |
|---|---|---|
| *B60T 1/06* | (2006.01) | |
| *F16D 65/00* | (2006.01) | |
| *F16D 65/18* | (2006.01) | |
| *F16D 121/04* | (2012.01) | |
| *F16D 127/06* | (2012.01) | |
| *F16D 129/02* | (2012.01) | |

(52) U.S. Cl.
CPC ............. *B60T 1/065* (2013.01); *F16D 65/0075* (2013.01); *F16D 65/18* (2013.01); *F16D 2121/04* (2013.01); *F16D 2127/06* (2013.01); *F16D 2129/02* (2013.01)

(58) Field of Classification Search
CPC . F16D 2121/02; F16D 65/18; F16D 2125/06; F16D 55/226; F16D 55/227
USPC ..................... 188/72.4, 73.43, 369
See application file for complete search history.

(56) References Cited

U.S. PATENT DOCUMENTS

| | | | | |
|---|---|---|---|---|
| 3,767,016 | A * | 10/1973 | Hurt ............................. | 188/71.9 |
| 4,570,531 | A * | 2/1986 | Anderson et al. ................. | 92/52 |
| 5,086,884 | A * | 2/1992 | Gordon et al. ............... | 188/71.9 |
| 5,921,356 | A * | 7/1999 | Stringer et al. ........... | 188/196 D |
| 6,484,852 | B1 | 11/2002 | Bunker | |
| 6,729,444 | B1 | 5/2004 | Schmandt et al. | |
| 6,851,761 | B2 | 2/2005 | Baumgartner et al. | |
| 7,455,152 | B2 | 11/2008 | Wang | |
| 7,559,413 | B2 | 7/2009 | Haffelder et al. | |
| 7,753,178 | B2 | 7/2010 | Ohtani et al. | |
| 8,091,689 | B2 | 1/2012 | Tristano et al. | |
| 2005/0077123 | A1* | 4/2005 | Malagoli et al. ............. | 188/72.4 |
| 2006/0131112 | A1* | 6/2006 | Hashida ...................... | 188/71.9 |
| 2009/0133973 | A1 | 5/2009 | Shibata | |

* cited by examiner

*Primary Examiner* — Anna Momper
*Assistant Examiner* — San Aung
(74) *Attorney, Agent, or Firm* — Roberts Mlotkowski Safran & Cole, P.C.

(57) ABSTRACT

A parking brake actuator for a disc brake caliper having at least one service piston. The parking brake actuator includes a tapered collet having an axial bore for receiving the service piston; a release piston, said release piston in axially alignment with the service piston and said tapered collet, said release piston having an internally disposed taper for co-acting with the taper of said tapered collet; and a biasing means, said biasing means structured and arranged to apply a force to said release piston sufficient to place the parking brake actuator in an actuated condition.

14 Claims, 1 Drawing Sheet

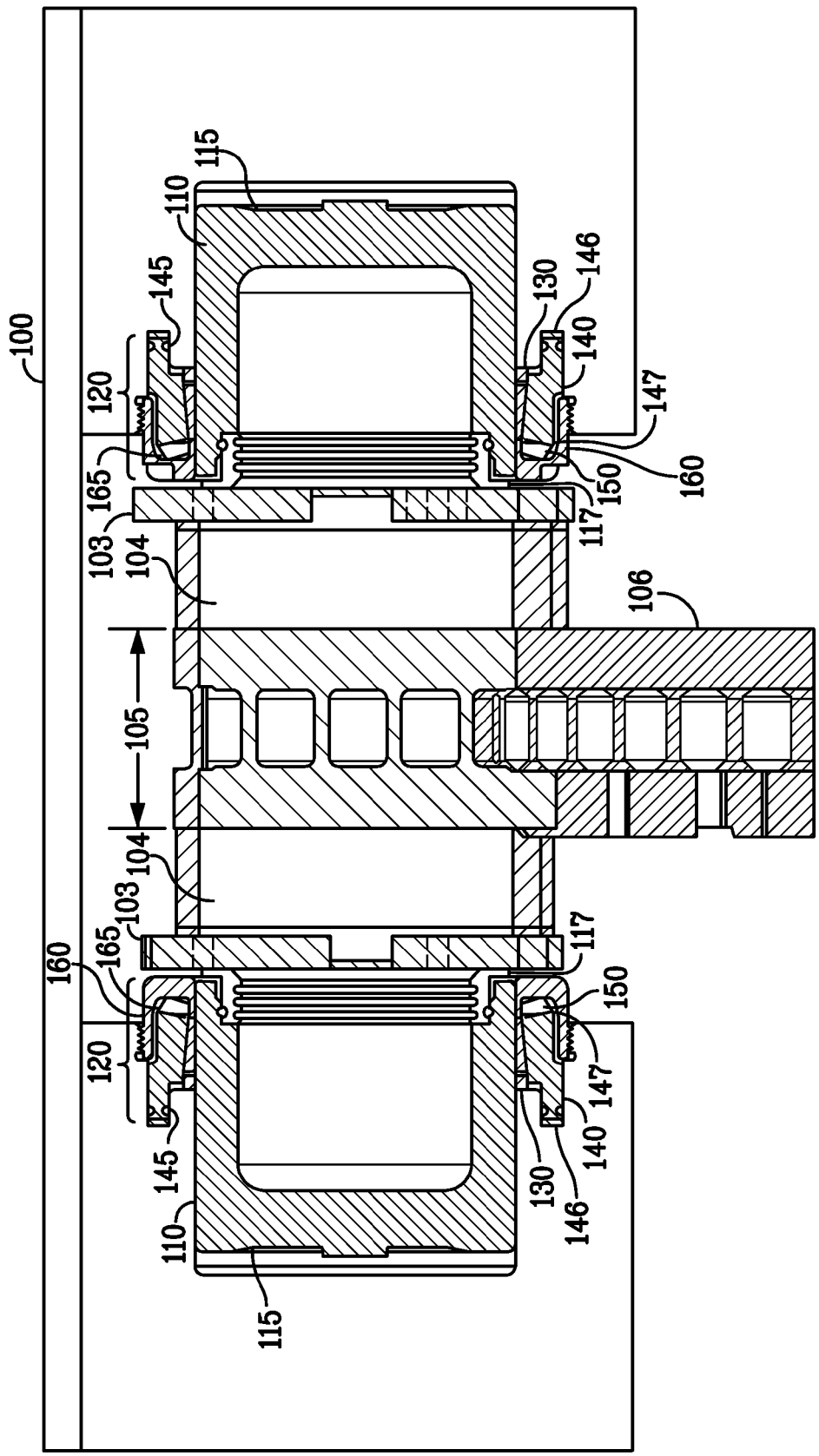

INTEGRATED PARKING BRAKE FOR DISC BRAKE

RELATED APPLICATION

This patent application claims priority to Provisional Application Ser. No. 61/715,578 filed on Oct. 18, 2012, which is hereby incorporated by reference in its entirety.

FIELD

Disclosed herein is a parking brake actuator and a disc brake caliper having an integral parking brake.

BACKGROUND

In the past, vehicle brakes were commonly of the drum/shoe design, having a pair of opposed arcuate brake shoes having a friction material disposed thereon within a hollow cylindrical drum. When the shoes were expanded, the friction material contacted an inner race of the drum to slow and/or stop the vehicle. In these designs, a relatively simple lever-actuated parking brake could be easily incorporated. However, with the advent of disc brakes, incorporation of a parking brake in the vehicle became more difficult.

One conventional design for a parking brake for disc brakes is known as a "drum-in-hat" assembly. Commonly, the rotating portion of a disc brake is known as a "top hat", which comprises an annular inner portion which is bolted to a vehicle hub, a generally cylindrical joining portion extending axially of the hub, and the brake rotor or disc itself, joined to the hub by the joining portion. According to the drum-in-hat parking brake design, the top hat has a conventional drum assembly incorporated therein, such as within the cylindrical joining portion of the top hat, wherein the inner surface of the joining portion is used as the drum, or even where a discrete drum is formed integral with the top hat at an inner portion thereof. U.S. Pat. No. 6,484,852 to Bunker and U.S. Pat. No. 6,729,444 to Schmandt et al. propose drum-in-hat parking brake designs. However, the complexity of drum-in-hat designs results in increased cost of manufacture, and somewhat poor reliability in the long run.

Integral disc brake calipers have been devised in the past and these typically have involved a hydraulic service brake actuator including a hydraulically driven piston, and a parking brake actuator which acts through a suitable mechanism to drive the piston in the manual parking brake mode. The arrangement is such that the hydraulic actuator is operable to shift the piston outwardly of a piston cylinder in which it is disposed, to engage a disc brake pad and to push the pad into engagement with the disc rotor. In some designs, engagement of the brake pad with the disc rotor can cause a second brake pad disposed on the opposite side of the rotor to shift into engagement with that side of the rotor and thus the rotor becomes sandwiched between the brake pads, producing a braking effect.

The parking brake actuator in such calipers is operable to produce the same movement of the disc brake pads to sandwich the rotor and in the known arrangements, the parking brake actuator has been operable to displace the service brake piston into engagement with the respective brake pad. To achieve that displacement, the parking brake actuator has been disposed within, or partly within the cylinder which houses the service brake piston, to act on the piston when the parking brake is to be actuated. In this type of arrangement, the construction of the caliper can be quite complicated in order to accommodate the parking brake actuator partly or fully within the service brake piston cylinder and in particular, the complicated nature of the caliper arises somewhat because accommodation of the parking brake actuator in the piston cylinder introduces at least an additional leakage path, increasing the likelihood of leakage from the piston cylinder. Because there is a need to properly seal against the increased likelihood of leakage this invariably complicates the construction and reliability of the caliper.

Several designs have been proposed to address one or more of the above-mentioned drawbacks, problems, or limitations of parking brakes for disc brake equipped vehicles.

For example, U.S. Pat. No. 6,851,761 to Baumgartner et al. proposes a control process that can be carried out during parking braking by way of a parking brake arrangement. The brake is applied by way of a service brake cylinder, and a position of a piston rod is fixed by rotation of a self-locking rotating spindle and application of the rotating spindle to the piston rod or an element connected in front of the piston rod. By additionally rotating the rotating spindle during parking braking, compensation can be made for shrinkages, particularly of a brake disc and/or brake linings, which occur during brake cooling.

U.S. Pat. No. 7,455,152 to Wang proposes a disc brake caliper for use with a disc brake rotor having a first side and a second side. The caliper further includes a first mounting portion and a second mounting portion each positioned adjacent one side of the disc brake rotor. The caliper further includes brake pads disposed adjacent the respective mounting portions such that brake pads are on opposite sides of the disc brake rotor and in facing relationship therewith. Further, the disc caliper includes a hydraulic service brake actuator and an electric parking brake actuator, each of which is operable independently of the other. Each of the actuators are arranged for actuation against a second side of the first brake pad for displacing the first brake pad away from the first mounting portion and into engagement with the disc brake rotor. The hydraulic service brake and the electric parking brake actuators have positions of actuation on the second side of the first brake pad at positions spaced apart.

U.S. Pat. No. 7,559,413 to Haffelder et al. proposes an automatic parking brake, including a brake piston, an auxiliary piston, a hydraulic chamber disposed between the brake piston and the auxiliary piston, a spring element, for prestressing the auxiliary piston, a spindle device connected to the auxiliary piston via a threaded connection, and a drive for the spindle device, wherein in a locked state of the parking brake, the brake piston is mechanically locked via the spindle device and the spring-loaded auxiliary piston, and in a released state of the parking brake, the auxiliary piston is blocked by means of the spring element and/or by means of the spindle device.

U.S. Pat. No. 7,753,178 to Ohtani et al. proposes a disc brake with a parking brake mechanism capable of exerting a large piston thrust required for operating a parking brake, without adversely affecting operation of a service brake. A parking brake mechanism, which is driven by an electric motor provided outside a housing, is incorporated in a caliper in which a piston is slidably disposed in a cylinder. The parking brake mechanism is slidably fitted via a seal member into the piston and provided with a nut member that is prevented from rotating relative to the piston by engagement of a pin and a pin hole; and a shaft that is screwed into the nut member. During a service brake operation, the piston alone is moved by a hydraulic pressure under a small piston thrust. During a parking brake operation, the piston and the nut member are moved together by applying a hydraulic pressure and operating the electric motor at the same time, to exert a large piston thrust, by using a large pressure receiving area of the piston and the nut member combined.

U.S. Pat. No. 8,091,689 to Tristano et al. proposes an automatic parking brake acting on a disc brake and in which the piston of the brake comprises a cavity in which there is a spring allowing pressure to be applied to the end of the piston cavity. A washer is positioned between the inlet of the cavity and the spring. A pressing device allows pressure to be applied to the washer so that it preloads the spring.

U.S. Published Patent Application No. 2009/0133973 to Shibata proposes a parking brake apparatus including a first braking member provided at a wheel and integrally rotated with the wheel, a second braking member provided at a vehicle body side for stopping a rotation of the first braking member, a parking brake device for pressing the second braking member to the first braking member by an operating force of a parking brake operation, a pressurizing device for pressurizing a brake fluid independently of the parking brake operation, and a hydraulic pressure controlling device for preliminarily pressing the second braking member to the first braking member by a brake fluid pressure pressurized by the pressurizing device in a case when the second braking member is pressed to the first braking member by means of the parking brake device.

However, despite recent advances, there remains an unmet need in the art to optimize disc brake calipers employing integral parking brakes to improve the performance and reliability thereof.

SUMMARY

In one aspect, disclosed herein is a parking brake actuator for a disc brake caliper having at least one service piston. The parking brake actuator includes a tapered collet having an axial bore for receiving the service piston; a release piston, the release piston in axially alignment with the service piston and the tapered collet, the release piston having an internally disposed taper for co-acting with the taper of the tapered collet; and a biasing means, the biasing means structured and arranged to apply a force to the release piston sufficient to place the parking brake actuator in an actuated condition.

In one form, the release piston includes a first end structured and arranged to receive a force for placing the parking brake actuator in a non-actuated condition.

In another form, a source of hydraulic fluid is provided for applying a force to the release piston for placing the parking brake in a non-actuated condition.

In yet another form, the actuated condition is achieved by biasing the release piston so as to advance the release piston causing the tapered collet and the internally disposed taper of the release piston to coact to a apply radial force to the service piston, thereby locking it in place.

In still yet another form, the biasing means comprises one or more Belleville washers.

In a further form, the one or more Belleville washers provide a spring force of between about 1000 and about 5000 pounds.

In a still further form, the one or more Belleville washers provide a spring force of between about 2000 and about 3000 pounds.

In one form, the parking brake actuator further comprises an end cap having a seat for and abutting the first biasing means.

In another form, the end cap includes a stop for limiting the travel of the release piston.

In yet another form, the release piston and tapered collet are formed from aluminum.

In another aspect, provided is a disc brake having an integral parking brake. The disc brake includes a disc brake caliper having a service brake piston slideably disposed within an annular locking means.

In one form, the annular locking means includes a tapered collet having an axial bore for receiving the service piston, an annular release piston surrounding the tapered collet, the release piston having an internally disposed taper for co-acting with the taper of the tapered collet, biasing means disposed at one end of the release piston, and an annular end cap for engaging the caliper, the end cap including a seat for the biasing means.

In another from, the tapered collet, the release piston and the biasing means are structured and arranged to lock the service brake piston when a deactivating force is removed from the release piston.

In yet another form, the internally disposed taper of the release piston coacts with the tapered outer surface of the collet to lock and unlock the service brake piston.

In yet another aspect, provided is a disc brake caliper having at least one integral parking brake actuator. The disc brake caliper includes at least one service brake piston slideably disposed within the caliper, a tapered collet having an axial bore for receiving and surrounding an outer circumference of the service brake piston, an annular release piston surrounding an outer circumference of the collet, and biasing means disposed at an end of and in contact with the release piston.

In one form, the outer surface of the tapered collet is tapered in a first direction, and an inner surface of the release piston is tapered in a second direction, opposite the first direction.

In another form, the tapered inner surface of the release piston coacts with the tapered outer surface of the collet to lock and unlock the service brake piston.

In yet another form, the service brake piston and the release piston have hydraulic fluid contacting surfaces at first ends thereof, and mechanical contacting surfaces at opposite second ends thereof.

In still yet another form, the service brake piston and the release piston are configured to employ separate hydraulic fluid systems.

In a further form, the biasing means is disposed between and in contact with the mechanical contacting surface of the release piston and a seat of an end cap secured in the caliper.

In a yet further form, the end cap is threaded into the caliper and is structured and arranged to slidably receive the second end of the release piston.

In a still yet further form, the a first portion of the end cap annularly surrounds the second end of the release piston and a second portion of the end cap forms the seat for the biasing means.

In still yet another aspect, provided is a disc brake caliper having an integral parking brake, which includes a parking brake actuator structured and arranged to apply an actuation force in a direction away from a disc brake pad disposed within the caliper to lock a service brake piston and effect the braking action of the parking brake.

In still yet another aspect, provided is a method of actuating a parking brake having a parking brake actuator, the parking brake actuator including an annular locking means disposed about a brake piston, the annual locking means including a tapered collet having an axial bore for receiving the brake piston, an annular release piston surrounding the tapered collet, and biasing means disposed at one end of the release piston, the method comprising the steps of: removing hydraulic pressure from a first end of the release piston; decompressing the biasing means to exert a force against a second end of the release piston; forcing the release piston in a direction so as to wedge an inner surface taper against an outer surface taper of the tapered collet; applying radial pressure to the tapered collet and thereby to an outer circumferential surface of the brake piston, fixing the position of the brake piston; and maintaining a brake pad in pressurized contact against a rotor, so as to lock the parking brake.

Other features and advantages of the present invention will appear from the following description in which the preferred embodiments have been set forth in detail in conjunction with the accompanying drawings.

BRIEF DESCRIPTION OF THE DRAWING

Notwithstanding any other forms that may fall within its scope, one preferred form of the invention will now be described by way of example only with reference to the accompanying drawings. Throughout the drawing identical structures are identified by identical reference numerals.

FIG. 1 is a sectional schematic view of a disc brake system having integral parking brakes, in accordance herewith.

DETAILED DESCRIPTION

Described herein is an integral disc brake caliper which incorporates both the vehicle service brake and the parking brake into a single caliper. Advantageously, the service brake and the parking brake both can be fluid-actuated, such as by hydraulic fluid or even pneumatically.

Regulations require that vehicle parking brakes not be dependent on the integrity of the service braking system, such that, for example, if a hydraulic or pneumatic failure occurs in the braking system, or when the vehicle is not in use, the parking brake remains actuated. This requirement has been a source of difficulty in designing integral disc brake calipers, since the service brake pistons operating the brake pads are generally actuated by hydraulic or pneumatic pressure. A loss of such pressure results in the brake pistons retracting, or at least not being sufficiently pressurized against the brake pads to prevent the vehicle from moving. As discussed above, there have been many efforts to overcome this difficulty, either by modifying the service brake piston design to incorporate a parking brake design, or by providing an entirely separate parking brake system, either within or outside of the brake caliper.

Disclosed herein is an integral parking brake which comprises a collet incorporated onto the service brake piston. The parking brake is used to mechanically lock the parking brake in the "on" state when fluid pressure is removed from the brake caliper, using the same brake pads as are used for the service brake. Since the parking brake system is incorporated with the service brake in the same disc brake caliper, and uses the same brake pad(s), a great savings in cost and complexity can be realized.

As may be appreciated by those skilled in the art, a collet is a device that forms a collar around an object to be held and exerts a strong radial clamping force onto the object when it is compressed or tightened, usually by means of a tapered outer collar. A collet typically includes a cylindrical inner surface and a tapered or frusto-conical outer surface, which is compressed or squeezed against a corresponding taper, such that its inner surface contracts to a slightly smaller circumference, squeezing the component whose secure holding is desired.

The parking brake disclosed herein utilizes an annular locking means which can comprise a collet assembly in which an annular collet surrounds the service brake piston, which, in normal vehicle operation, is slideably disposed within the collet. The locking means further comprises an annular release piston surrounding the collet, which is structured and arranged to coact with the collet to lock the service brake piston against the brake pads when the parking brake actuator is engaged, by applying a radial force through the collet to the service brake piston.

The coaction between the collet and the release piston is accomplished by the outer circumferential surface of the collet being tapered in a first direction and the inner circumference of the release piston being tapered in a second direction, opposite to that of the collet taper. When the release piston is axially forced relative to the collet, the respective tapers coact to apply radial force to the service piston, thereby locking it in place, thus locking the parking brake. When an axial force is applied in the opposite direction, so as to substantially reduce or eliminate the radial force acting upon the service piston, the service piston is permitted to slide within the parking brake actuator, thus unlocking the parking brake.

As disclosed herein, when the respective tapers are properly configured, the parking brake is engaged when the force applied by the hydraulic fluid system to the release piston is removed. As such, the vehicle parking brake is actuated when the associated hydraulics are without power. This is accomplished by applying a force by way of a biasing means, such as by one or more Belleville washers/springs, against a mechanical contact surface of the release piston in a direction opposite to the force applied by the hydraulic fluid system when the force applied by the hydraulic system is removed, permitting actuation of the parking brake. In this manner, the coacting tapers are forced together and act to constrict the collet against the service brake piston. When it is again desired to put the vehicle into service, the hydraulic force is applied to a hydraulic fluid contacting surface of the release piston, axially forcing the coacting tapers apart, releasing the service brake piston and thereby the parking brake. Of course, when the parking brake is released, the service brake piston is free to slide within the collet assembly, and can be conventionally actuated as-needed by the vehicle's operator.

A "Belleville washer", also known as a coned-disc spring, conical spring washer, disc spring, Belleville spring or cupped spring washer, is a type of spring shaped like a washer. It has a frusto-conical shape which gives the washer a spring characteristic. Belleville washers are typically used as springs, or to apply a pre-load or flexible quality to a bolted joint or bearing. Advantageously, multiple Belleville washers may be stacked to modify the spring constant or amount of deflection. Stacking in the same direction will increase the spring constant, similar to adding springs in parallel, creating a stiffer joint (with the same deflection). Stacking in an alternating direction is similar to adding springs in series, resulting in a lower spring constant and greater deflection. Mixing and matching directions allow a specific spring constant and deflection capacity to be designed.

Of course, the spring force applied against the collet can be produced by an alternative biasing means, such as a compression spring, or the like, as those skilled in the art will plainly recognize.

In contrast to conventional parking brake designs, in one form, the parking brake locking force is applied in a direction opposite to the force applied to actuate the service brake, i.e. in a direction away from the rear surface of the brake pad(s). The operation and advantages of this system will become apparent in the description below.

FIG. 1 is a sectional view of a vehicular disc brake system having integral service and parking brakes, in accordance herewith. In this view, a disc brake caliper (100) is illustrated with two braking systems disposed on opposite sides of rotor slot (105) for disc brake rotor (106), conventionally attached to the rotor hat and hub (not shown). Each braking system employs a service brake piston (110) which contacts brake pads (104) through their backing plates (103). Those having skill in the art will understand that the service brake pistons are activated by hydraulic force applied by hydraulic fluid conventionally delivered through a system of hydraulic passages (not shown) within brake caliper (100). The service brake pistons (110) are forced axially against the backing plates (103) of brake pads (104), to apply a braking force against the faces of rotor (106).

As described herein, the vehicular disc brake system incorporates an annular locking means, i.e. a parking brake mechanism (120) surrounding each service brake piston (110).

The parking brake actuator mechanism (120) is annularly disposed around a portion of the outer circumference of service brake piston (110), which has a hydraulic fluid contacting surface (115) at a first end thereof, and a mechanical contacting surface at the opposite end thereof, provided by piston cap (117), which is configured to mechanically contact the backing plate (103) of a brake pad (104).

Parking brake actuator mechanism (120) comprises a collet (130) annularly disposed about and in contact with service brake piston (110). The outer circumferential surface of collet (130) is tapered, such that the thickness at the end closest to the brake pad is less than the thickness thereof at the opposite end. The parking brake mechanism also comprises an annular release piston (140), having a fluid contacting surface (146), sealed against fluid leakage by seals (145), and a mechanical contacting surface (147).

The release piston (140) is annularly disposed around and in axial co-alignment with collet (130). A biasing means (150), such as at least one annular Belleville washer/spring, is disposed in contact with the mechanical contacting surface (147) of release piston (140) and held in place with an end cap (160), which is held captive within the caliper, such as by being threaded into the caliper with threads on the outer circumference thereof. End cap (160) comprises a seat (165) for biasing means (150), such that the biasing means is held in compression between seat (165) and the mechanical contacting surface (147) of release piston (140). Notably, end cap (160) is structured and arranged to slidably receive the second end of release piston (140), including the mechanical contacting surface (147). Accordingly, a first portion of end cap (160) annularly surrounds the second end of the release piston (140) and a second portion of the end cap (160) forms a seat (165) for the biasing means.

A hydraulic force is applied to release pistons (140), which is sufficient to overcome the opposing force of the biasing means, when activated and is applied by hydraulic fluid delivered through a system of hydraulic passages (not shown) within brake caliper (100), separate from those used to supply the service brake piston. In fact, in one form, the service brake system hydraulics and the parking brake system hydraulics are separate systems.

The operation of the present invention will now be explained referencing to FIG. 1. During normal operation of the vehicle, the parking brake mechanism is deactivated by hydraulic force applied to the release piston (140), overcoming the force applied by the biasing means (150), which acts to separate the respective tapers of collet (130) and release piston (140). In this manner, little to no radial pressure is exerted on the service brake piston (110), and it is thus substantially free to slide axially within collet (130), thus enabling the vehicle operator to apply and release the vehicle service brake as-needed.

When the vehicle is stopped, in order to set the parking brake, the vehicle operator will maintain hydraulic pressure on the service brakes, maintaining pressure against service brake piston (110), in order to keep the brake pads (104) in place against the rotors (106). Through a series of suitably arranged fluid valves (not shown), the hydraulic pressure against release piston (140) is removed, biasing means (150) are decompressed, thus exerting force against the mechanical contact surface (147) of release piston (140) and the release piston is forced in a direction so as to wedge the inner circumferential taper of release piston (140) against the outer circumferential taper of collet (130), thus applying radial pressure to the collet and thereby to the outer circumferential surface of service brake piston (110), locking it into place and maintaining brake pads (104) in pressurized contact against rotor (106), so as to lock the parking brake. In one form, the force applied by biasing means (150) to lock the parking brake is in a direction opposite to the direction of a force applied to actuate the service brakes.

Upon restart of the vehicle, and/or deactivation of the parking brake, hydraulic force is once again applied against the fluid contacting surface (146) of release piston (140), again forcing it to the right so as to release the radial locking force applied to service piston (110) by the combination of the tapers of collet (130) and release piston (140), again permitting the service brake piston (110) to freely slide within collet (130).

As such, in one form, provided is a method of actuating a parking brake having a parking brake actuator, the parking brake actuator including an annular locking means disposed about a brake piston, the annual locking means including a tapered collet having an axial bore for receiving the brake piston, an annular release piston surrounding the tapered collet, and biasing means disposed at one end of the release piston, the method comprising the steps of: removing hydraulic pressure from a first end of the release piston; decompressing the biasing means to exert a force against a second end of the release piston; forcing the release piston in a direction so as to wedge an inner surface taper against an outer surface taper of the tapered collet; applying radial pressure to the tapered collet and thereby to an outer circumferential surface of the brake piston, fixing the position of the brake piston; and maintaining a brake pad in pressurized contact against a rotor, so as to lock the parking brake.

As may be appreciated by those skilled in the art, in one form, the manner of operation of the present invention is unique, in that the parking brake mechanism is structured and arranged to lock the parking brake by a force applied in a direction away from the rear face of the disc brake pads. Conversely, the parking brake mechanism is structured and arranged to release the parking brake by a force applied in a direction toward the disc brake pad.

As such, in one form, provided is a disc brake caliper having an integral parking brake, which includes a parking brake actuator structured and arranged to apply an actuation force in a direction away from a disc brake pad disposed within the caliper to lock a service brake piston and effect the braking action of the parking brake.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

We claim:

1. A disc brake having an integral parking brake, comprising a disc brake caliper having a service brake piston slideably disposed within an annular locking means, wherein said annular locking means comprises a tapered collet having an axial bore for receiving the service piston, an annular release piston surrounding said tapered collet, said release piston having an internally disposed taper for co-acting with the taper of said tapered collet, biasing means disposed at one end of said release piston, and an annular end cap for engaging said caliper, said end cap including a seat for said biasing means.

2. The disc brake of claim 1, wherein said tapered collet, said release piston and said biasing means are structured and arranged to lock said service brake piston when a deactivating force is removed from said release piston.

3. The disc brake of claim 1, wherein said internally disposed taper of said release piston coacts with the tapered outer surface of said collet to lock and unlock said service brake piston.

4. A disc brake caliper having at least one integral parking brake actuator, comprising:
    at least one service brake piston slideably disposed within the caliper;
    a tapered collet having an axial bore for receiving and surrounding an outer circumference of said service brake piston;
    an annular release piston surrounding an outer circumference of said collet; and
    biasing means disposed at an end of and in contact with said release piston.

5. The disc brake caliper of claim 4, wherein said biasing means comprises one or more Belleville washers.

6. The disc brake caliper of claim 4, wherein said outer surface of said tapered collet is tapered in a first direction, and an inner surface of said release piston is tapered in a second direction, opposite said first direction.

7. The disc brake caliper of claim 6, wherein said tapered inner surface of said release piston coacts with said tapered outer surface of said collet to lock and unlock said service brake piston.

8. The disc brake caliper of claim 4, wherein each of said service brake piston and said release piston have hydraulic fluid contacting surfaces at first ends thereof, and mechanical contacting surfaces at opposite second ends thereof.

9. The disc brake caliper of claim 8, wherein said service brake piston and said release piston are configured to employ separate hydraulic fluid systems.

10. The disc brake caliper of claim 8, wherein said biasing means is disposed between and in contact with the mechanical contacting surface of said release piston and a seat of an end cap secured in said caliper.

11. The disc brake caliper of claim 10, wherein said end cap is threaded into said caliper.

12. The disc brake caliper of claim 10, wherein said end cap is structured and arranged to slidably receive the second end of said release piston.

13. The disc brake caliper of claim 12, wherein a first portion of said end cap annularly surrounds said second end of said release piston and a second portion of said end cap forms said seat for said biasing means.

14. A method of actuating a parking brake having a parking brake actuator, the parking brake actuator including an annular locking means disposed about a brake piston, the annual locking means including a tapered collet having an axial bore for receiving the brake piston, an annular release piston surrounding the tapered collet, and biasing means disposed at one end of said release piston, the method comprising the steps of:
    a) removing hydraulic pressure from a first end of the release piston;
    b) decompressing the biasing means to exert a force against a second end of the release piston;
    c) forcing the release piston in a direction so as to wedge an inner surface taper against an outer surface taper of the tapered collet;
    d) applying radial pressure to the tapered collet and thereby to an outer circumferential surface of the brake piston, fixing the position of the brake piston; and
    e) maintaining a brake pad in pressurized contact against a rotor, so as to lock the parking brake.

* * * * *